United States Patent
Kokkonen et al.

(10) Patent No.: US 7,110,474 B2
(45) Date of Patent: Sep. 19, 2006

(54) METHOD FOR DETERMINING A BOUNDARY OF AN INFORMATION ELEMENT, A SYSTEM, AND AN ELECTRONIC DEVICE

(75) Inventors: Mikko Kokkonen, Helsinki (FI); Samuli Pietilä, Tampere (FI)

(73) Assignee: Noika Corporation, Espoo (FI)

( * ) Notice: Subject to any disclaimer, the term of this patent is extended or adjusted under 35 U.S.C. 154(b) by 872 days.

(21) Appl. No.: 10/101,385

(22) Filed: Mar. 15, 2002

(65) Prior Publication Data
US 2002/0159542 A1    Oct. 31, 2002

(30) Foreign Application Priority Data
Mar. 16, 2001    (FI)    .................................. 20010543

(51) Int. Cl.
   *H04L 27/14*    (2006.01)
(52) U.S. Cl. .................................................. 375/324
(58) Field of Classification Search ................ 375/145, 375/147, 150, 368, 343, 324, 354, 355, 356, 375/359, 362, 364, 365, 366; 342/357.12; 708/441, 809; 370/503, 504, 507, 508, 509, 370/510, 511, 512, 513, 514, 516, 517, 518, 370/519, 520
See application file for complete search history.

(56) References Cited

U.S. PATENT DOCUMENTS

| | | | | |
|---|---|---|---|---|
| 5,237,587 A | * | 8/1993 | Schoolcraft | ................ 375/150 |
| 5,285,291 A | * | 2/1994 | Schiller | ....................... 358/453 |
| 5,694,416 A | * | 12/1997 | Johnson | ....................... 375/148 |
| 5,768,319 A | | 6/1998 | Durboraw, III | ............. 375/316 |
| 5,909,462 A | * | 6/1999 | Kamerman et al. | ......... 375/147 |
| 6,181,755 B1 | | 1/2001 | Junell | ......................... 375/362 |
| 6,370,397 B1 | * | 4/2002 | Popovic et al. | ............. 455/561 |
| 6,580,749 B1 | * | 6/2003 | Miura | ......................... 375/147 |
| 6,731,622 B1 | * | 5/2004 | Frank et al. | ................ 370/342 |
| 6,868,110 B1 | * | 3/2005 | Phelts et al. | ................ 375/144 |

FOREIGN PATENT DOCUMENTS

| | | |
|---|---|---|
| DE | 3131845 | 2/1983 |
| EP | 0923208 A2 | 6/1999 |
| WO | WO 90/06642 | 6/1990 |
| WO | WO 00/14560 | 3/2000 |

OTHER PUBLICATIONS

Hoeher "Optimal Subblock-by Subblock Detection", IEEE, Apr. 1995, vol. 43, p. 714-717.*
English translation of the abstract attached.

* cited by examiner

*Primary Examiner*—Khanh Tran
*Assistant Examiner*—Sam K. Ahn
(74) *Attorney, Agent, or Firm*—Perman & Green, LLP (57) ABSTRACT

A method for determining a boundary of an information element, in which a repetition coded signal transmitted by satellites is received, which signal is modulated with information elements. A group of symbols forms one information element. A group of reference values are formed on the basis of the received signal. Of these reference values at least one vector is formed wherein the number of the elements corresponds to the number of symbols use in the transmission of the information element. A determination vector is formed on the basis of the at least one vector, whereafter the greatest of the elements of the determination vector is searched. The index of said elements indicates the boundary of the information element.

28 Claims, 10 Drawing Sheets

METHOD FOR DETERMINING A BOUNDARY OF AN INFORMATION ELEMENT, A SYSTEM, AND AN ELECTRONIC DEVICE

FIELD OF THE INVENTION

The present invention relates to a method for determining a boundary of an information element according to the preamble of the appended claim 1. The invention further relates to a system as set forth in the preamble of the appended claim 12. The invention relates also to an electronic device as set forth in the preamble of the appended claim 20.

BACKGROUND OF THE INVENTION

In positioning systems based on satellite positioning a positioning receiver attempts to receive signals of at least four satellites in order to find out the position of the positioning receiver and the time data. An example of such a satellite positioning system is the GPS system (Global Positioning System), comprising a plurality of satellites orbiting the globe according to predefined orbits. These satellites transmit positioning data, on based of which the position of a satellite can be defined at each moment of time, in case the exact time data used in the satellite positioning system is known in the positioning receiver. In the GPS system the satellites transmit a spread spectrum modulated signal that is modulated with a code that is individual for each satellite. Thus, the positioning receiver can distinguish signals transmitted by different satellites from each other by using a reference code corresponding to the satellite code generated locally in the positioning receiver.

A drawback with such positioning systems based on satellite positioning is often the fact that a signal transmitted by a satellite is strongly attenuated when arriving to the positioning receiver, wherein it is very difficult to distinguish the signal from the background noise. The signal is attenuated inter alia by climatic conditions and obstacles, such as buildings and surrounding grounds in the routing of the signal. Also, the signal can travel to the positioning receiver through a plurality of different routes which causes so-called multipath propagation and aggravates the sychronizing of the positioning receiver to a wished signal because the transmitted signal arrives to the receiver through different routings, for example straight from the satellite (line-of-sight) and, in addition to this, reflected. Due to this multipath propagation the same signal is received as several signals with different phases. It is particularly difficult to perform positioning inside a building, because the building itself strongly attenuates the signal transmitted by satellites and, on the other hand, multipath propagation can be even stronger because possibly reflected signals coming for example through a window are not necessarily as attenuated as signals coming straight through the roof. In this case the receiver can make erroneous interpretations about the propagation time and the positioning of the satellite at the moment of transmission of the signal inter alia due to said addition to the propagation time of the signal caused by multipath propagation Each operating satellite of the GPS system transmits a so-called L1 signal in the carrier frequency of 1575.42 MHz. This frequency is also indicated with $154f_0$, where $f_0=10.23$ MHz. Furthermore, the satellites transmit another ranging signal at a carrier frequency of 1227.6 MHz called L2, i.e. $120f_0$. In the satellite, the modulation of these signals is performed with at least one pseudo random sequence. This pseudo random sequence is different for each satellite. As a result of the modulation, a code-modulated wideband signal is produced. The modulation technique used makes it possible to distinguish in the receiver the signals transmitted from different satellites, although the carrier frequencies used in the transmission are substantially the same. This modulation technique is called code division multiple access (CDMA). In each satellite, for modulating the L1 signal, the pseudo random sequence used is e.g. a so-called C/A code (Coarse/Acquisition code), which is a code from the family of the Gold codes. Each GPS satellite transmits a signal by using an individual C/A code. The codes are formed as a modulo-2 sum of two 1023-bit binary sequences. The first binary sequence G1 is formed with a polynome $X^{10}+X^3+1$, and the second binary sequence G2 is formed by delaying the polynome $X^{10}+X^9+X^8+X^6+X^3+X^2+1$ in such a way that the delay is different for each satellite. This arrangement makes it possible to produce different C/A codes by an identical code generator. The C/A codes are thus binary codes whose chipping rate in the GPS system is 1.023 MHz. The C/A code comprises 1023 chips, wherein the duration of the epoch is 1 ms. The carrier of the L1 signal is further modulated by navigation information at a bit rate of 50 bit/s. The navigation information comprises information about the "health", orbit, time data of the satellite, etc.

During their operation, the satellites monitor the condition of their equipment. The satellites may use for example so-called watchdog operations to detect and report possible faults in the equipment. The errors and malfunctions can be instantaneous or longer lasting. On the basis of the health data, some of the faults can possibly be compensated for, or the information transmitted by a malfunctioning satellite can be totally disregarded. Furthermore, in a situation in which the signal of more than four satellites can be received, the information received from different satellites can be weighted differently on the basis of the health data. Thus, it is possible to minimize the effect of errors on measurements, possibly caused by satellites that seem unreliable.

To detect the signals of the satellites and to identify the satellites, the receiver must perform acquisition, whereby the receiver searches for the signal of each satellite at the time and attempts to be synchronized and locked to this signal so that the data transmitted with the signal can be received and demodulated.

The positioning receiver must perform the acquisition e.g. when the receiver is turned on and also in a situation in which the receiver has not been capable of receiving the signal of any satellite for a long time. Such a situation can easily occur e.g. in portable devices, because the device is moving and the antenna of the device is not always in an optimal position in relation to the satellites, which impairs the strength of the signal coming in the receiver.

The positioning arrangement has two primary functions:
1. to calculate the pseudo ranges between the receiver and the different GPS satellites, and
2. to determine the position of the receiver by utilizing the calculated pseudo ranges and the position data of the satellites. The position data of the satellites at each time can be calculated on the basis of the ephemeris and time correction data received from the satellites.

The distances to the satellites are called pseudo ranges, because the time is not accurately known in the receiver. Thus, the determinations of position and time are repeated until a sufficient accuracy is achieved with respect to time and position. Because time is not known with absolute precision, the position and the time must be determined e.g. by linearizing a set of equations for each new iteration.

The pseudo range can be calculated by measuring the pseudo transmission time delays between signals of different satellites.

Almost all known GPS receivers utilize correlation methods for acquisition to the code as well as for tracking. In a positioning receiver, reference codes ref(k), i.e. the pseudo random sequences for different satellites are stored or generated locally. A received signal is subjected to conversion to an intermediate frequency (down conversion), after which the receiver multiplies the received signal with the stored pseudo random sequence. The signal obtained as a result of the multiplication is integrated or low-pass filtered, wherein the obtained result is information on whether the received signal contained a signal transmitted by a satellite. The multiplication is iterated in the receiver so that the phase of the pseudo random sequence stored in the receiver is shifted each time. The correct phase is inferred from the correlation result preferably so that when the correlation result is the greatest, the correct phase has been found. Thus, the receiver is correctly synchronized with the received signal. After the code acquisition has been completed, the next steps are frequency tuning and phase locking.

The above-mentioned acquisition and frequency control process must be performed for each signal of a satellite received in the receiver. Some receivers may have several receiving channels, wherein an attempt is made on each receiving channel to be synchronized with the signal of one satellite at a time and to find out the information transmitted by this satellite.

The positioning receiver receives information transmitted by satellites and performs positioning on the basis of the received information. For the positioning, the receiver must receive the signal transmitted by at least four different satellites to find out the x, y, z coordinates and the time data. The received navigation information is stored in a memory, wherein this stored information can be used to find out e.g. the positioning data of satellites.

Figure 1:
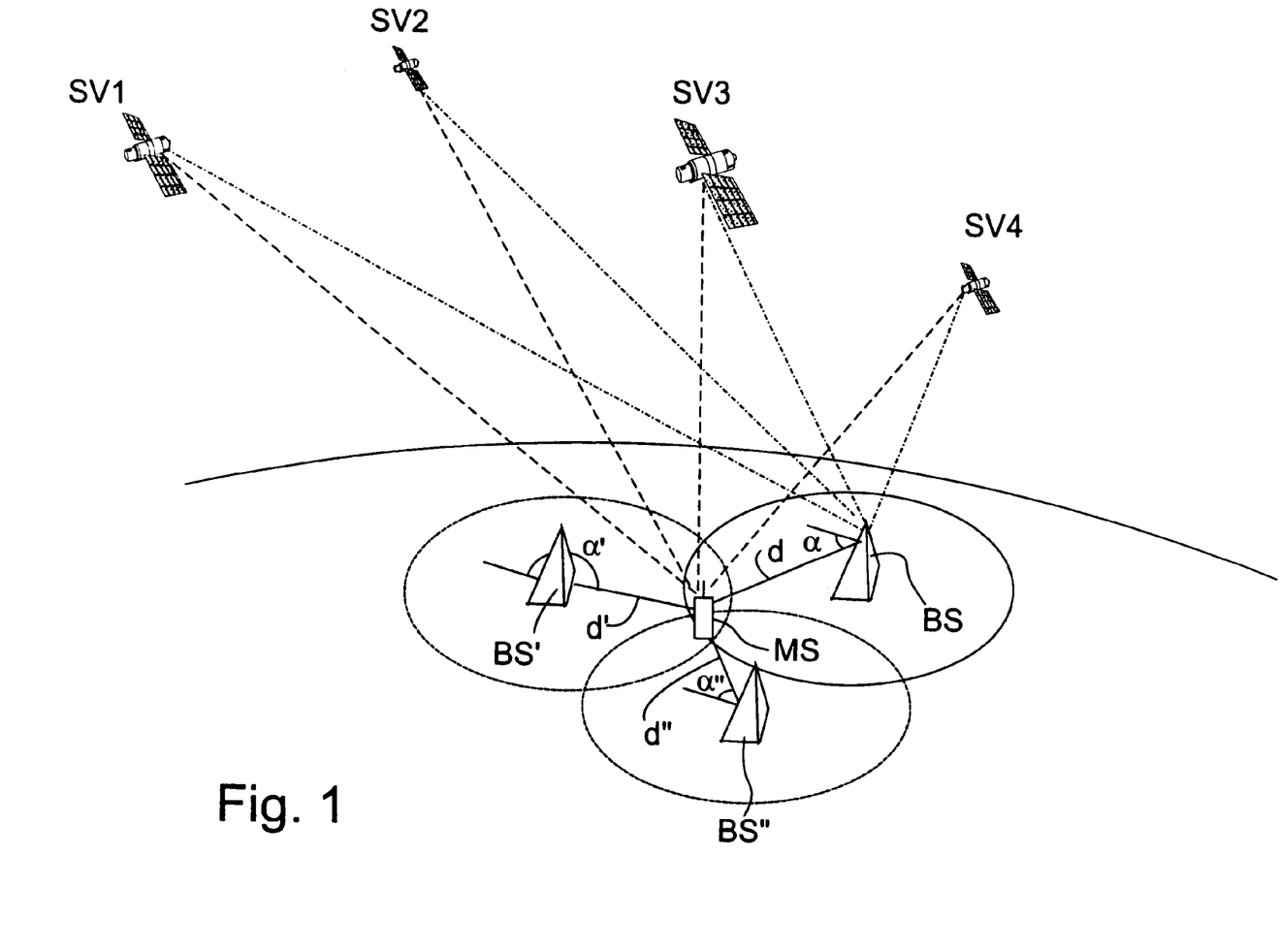
FIG. 1 shows the method according to a preferred embodiment of the invention in a reduced manner.

FIG. 1 shows, in a principle chart, positioning in a wireless communication device MS comprising a positioning receiver by means of a signal transmitted from four satellites SV1, SV2, SV3, SV4. In the GPS system, the satellites transmit ephemeris data as well as time data, on the basis of which the positioning receiver can perform calculations to determine the position of the satellite at a time. These ephemeris data and time data are transmitted in frames that are further divided into subframes. In the GPS system, each frame comprises 1500 bits that are divided into five subframes of 300 bits each. Since the transmission of one bit takes 20 ms, the transmission of each subframe thus takes 6 s, and the whole frame is transmitted in 30 seconds. The subframes are numbered from 1 to 5. In each subframe 1, e.g. time data is transmitted, indicating the moment of transmission of the subframe as well as information about the deviation of the satellite clock with respect to the time in the GPS system.

The subframes 2 and 3 are used for the transmission of ephemeris data. The subframe 4 contains other system information, such as universal time, coordinated (UTC). The subframe 5 is intended for the transmission of almanac data of all the satellites. The entity of these subframes and frames is called a GPS navigation message that comprises 25 frames, i.e. 125 subframes. The length of the navigation message is thus 12 min 30 s.

In the GPS system, time is measured in seconds from the beginning of a week. In the GPS system, the moment of beginning of a week is mid-night between Saturday and Sunday. Each subframe to be transmitted contains information on the moment of the GPS week when the subframe in question was transmitted. Thus, the time data indicates the time of transmission of a certain bit, i.e. in the GPS system, the time of transmission of the last bit in the subframe in question. In the satellites, time is measured with high-precision atomic chronometers. In spite of this, the operation of each satellite is controlled in a control centre for the GPS system (not shown), and e.g. a time comparison is performed to detect chronometric errors in the satellites and to transmit this information to the satellite.

For precise positioning it is of great importance how precisely the real GPS time is known by the receiver. In practice, precise GPS time can be defined after the positioning calculation, in which the clock error of the receiver with respect to the GPS time is determined. However, in the very first positioning calculation, an estimation of the GPS time can be used, because the real GPS time is not necessarily known by the receiver. The estimated GPS time at a moment of time k can be derived on the basis of measurement of three time elements according to the following formula:

$$T_{GPS}^{j}(k)=T_{Tow}^{j}(k)+T_{ms}^{j}(k)+T_{chip}^{j}(k)+0.078 \quad (1)$$

in which $T_{TOW}^{j}$=the time data (time of week) in seconds contained in the last received subframe, $T_{ms}^{j}(k)$=the time in seconds corresponding to the number of C/A epochs received after the beginning of the last received subframe, $T_{chip}^{j}(k)$ the time in seconds corresponding to the number (from 0 to 1022) and the code phase of whole chips received after the latest change of epoch, and j=the receiving channel index.

In Formula 1, the average time of flight (ToF) of the signal from the satellite to the receiver is 78 ms. As a reference it is possible to use any such receiving channel in which the signal-to-noise ratio (SNR) is sufficient.

The time data (ToW) is transmitted in the navigation message at intervals of six seconds and it indicates the time passed from the latest change of the GPS week. Thus, the value range of the time data is the remainder of one week. In a corresponding manner $T_{ms}^{j}(k)$ equals the remainder of six seconds and $T_{chip}^{j}(k)$ equals the remainder of 1 ms. The first three terms of the Formula (1) can also be used in the measurement of the time of arrival (ToA) of the signal.

In poor receiving conditions, in which the navigation data cannot be detected e.g. due to a high bit error rate (BER), it is not possible to determine the GPS time directly by means of the Formula 1. However, the code phase can normally still be measured.

In poor signal conditions, it is possible to try to detect the moment of change for the bit (boundary). The detection of bit boundary is necessary in order to detect the navigation data, to use coherent integration in the tracking loop, and/or to calculate pseudo ranges in such a receiver in which the control is performed only according to the C/A code.

In some prior art receivers, so-called hard decisions are used for detecting the bit boundary. In the receivers, the received signal is integrated during an epoch. Subsequently (1 ms), the output signal of the correlator of the receiver is examined. In the histogram method the output value of the correlator is compared to the previous output value. In case the output values are of opposite sign, a decision is made that the sign of the data bit has changed. The reliability of each such decision made after a change in epoch is highly deteriorating as the signal/noise ratio (C/NO) deteriorates, wherein also the probability of erroneous positioning increases. Using this method presupposes that the synchronizing part of the receiver is phase-locked into the epoch. Additionally, it is troublesome to adapt this method in such receivers in which common dump is used.

In another receiver, correlation of a received signal is performed to a pre-synchronising part (preamble of Telemetry Word), whose contents are known. A drawback with this arrangement is that the synchronizing time is relatively long, on average at least 3 seconds. Additionally, the final error ratio is rather poor, because the length of the initial synchronizing part is only 8 bits.

SUMMARY OF THE INVENTION

The purpose of the present invention is to obtain an improved method for detecting the bit boundary from the received signal, and a receiver in which the aim is to detect the bit boundary. More precisely, the method according to the present invention is primarily characterized in what will be presented in the characterizing part of the appended claim 1. The system according to the present invention is primarily characterized in what will be presented in the characterizing part of the appended claim 12. The electronic device according to the present invention is primarily characterized in what will be presented in the characterizing part of the appended claim 20.

Considerable advantages are achieved by the present invention when compared with positioning systems and receivers of prior art. Because in the method of the invention the bit boundary can be detected also from a weak and noisy signal more reliably than when applying prior art methods, the positioning reliability can be improved. Moreover, when applying the method of the invention it is possible to detect the contents of the data transferred in the signal faster than in the prior art, because the bit boundary can be detected more precisely. The use of the method according to the invention allows positioning also indoors, which is not necessarily possible with prior art solutions.

BRIEF DESCRIPTION OF THE DRAWINGS

In the following, the present invention will be described in more detail with reference to the appended drawings, in which.

DETAILED DESCRIPTION OF THE INVENTION

Figure 2A:
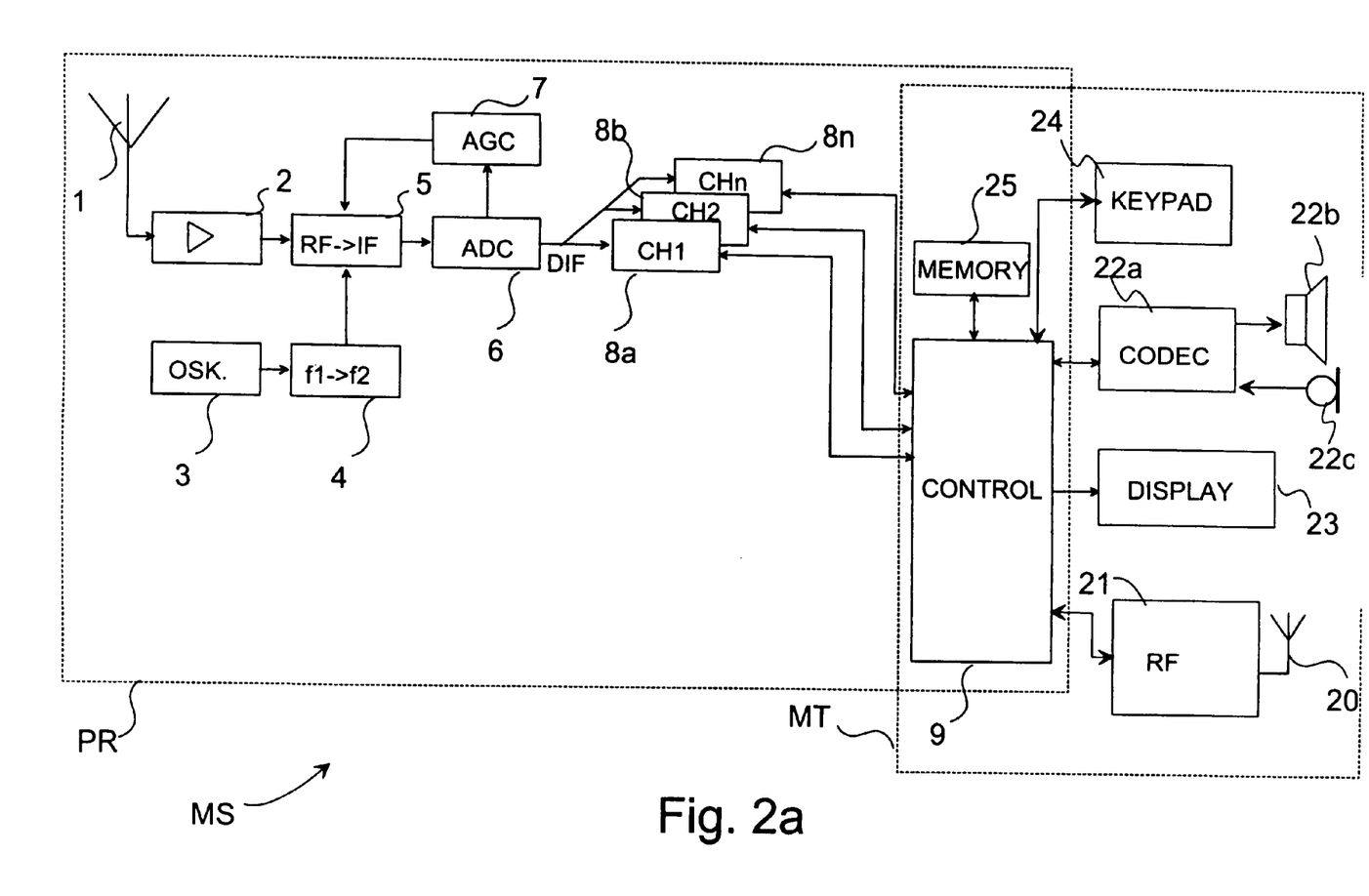
FIGS. 2a and 2b show an electronic device according to a preferred embodiment of the invention in a reduced block chart.

In the following, the operation of the method according to a preferred embodiment of the invention will be described with reference to the system shown in FIG. 1. An electronic device that performs positioning is exemplified by a wireless communication device MS shown in FIG. 2, which comprises, in addition to a mobile terminal MT, also a positioning receiver PR. In this case, the mobile terminal MIT can be used for transmitting information between the wireless communication device MS and the base stations BS, BS', BS" of the mobile communication network MN.

Next, the operation of an advantageous receiver PR will be briefly described with reference to the reduced block charts of FIGS. 2a and 2b. The repetition-coded signal to be received via an antenna 1 is amplified in a high-frequency amplifier 2 and converted by means of a clock signal generated by a clock generator 3 and a frequency synthesizer 4 preferably to an intermediate frequency or directly to a baseband in a modifying block 5. At this stage, the signal is still advantageously in analog format, wherein it is converted to a digital signal in an analog-to-digital converter 6. The analog-to-digital converter 6 produces not only a digital, receiving signal but also a control to an automatic gain control 7 (AGC), which attempts to level out strength variations in the received signal in a way known as such. The digital signal converted to an intermediate frequency or the baseband is led to one or more digital monitoring blocks 8a, 8b, 8n to perform conversion of the digital signal to two signals with different phases (I/Q) and multiplication with a reference code. The signals formed in the monitoring blocks 8a, 8b, 8n are further conducted to a control block 9 for trying to find out the code phase and the frequency shift of the received signal. The control block 9 forms feedback to the monitoring blocks 8a, 8b, 8n to adjust the code phase of the reference code and a numerically controlled oscillator 18, if necessary. After the code phase and the frequency shift have been detected, that is the receiver has locked the signal to be received, it is possible to start demodulation and storage of the navigation information transmitted in the signal, if necessary. The control block 9 stores navigation information preferably in the memory 25.

Figure 2B:
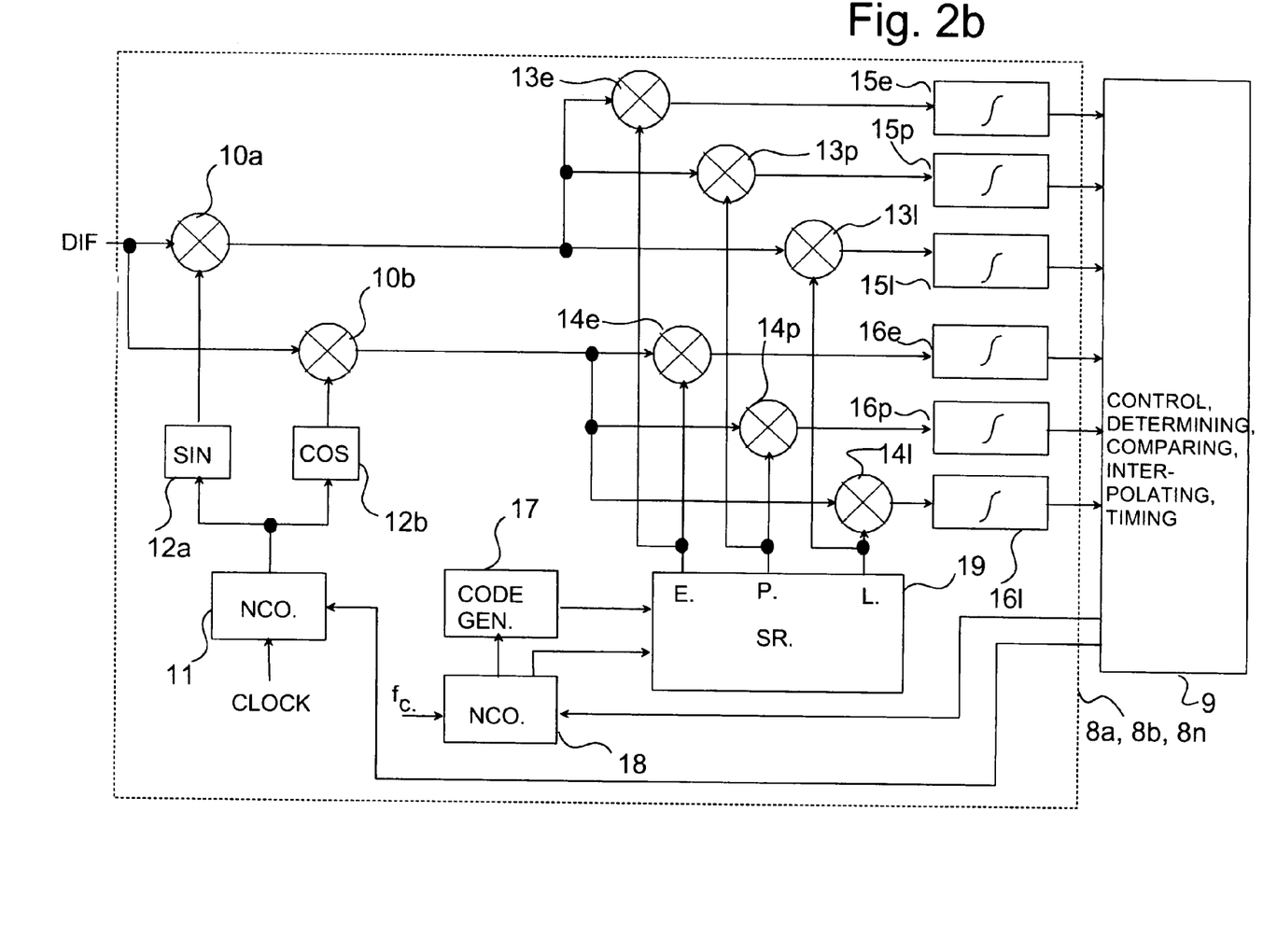

An advantageous structure for the digital monitoring blocks 8a, 8b, 8n is shown in the block chart of FIG. 2b. The digital signal converted to an intermediate frequency or the baseband is mixed in mixers 10a, 10b with the signal generated by a numerically controlled oscillator 11 in such a way that there is phase difference of about 90° between the oscillator signal to be input in the first mixer 10a and the oscillator signal to be input in the second mixer 10b. Thus, the mixing result is a signal comprising two components in a way known as such: the I and Q components. In the formation of the phase difference, phase shift blocks 12a, 12b are preferably used. Next, the I and Q components are subjected to multiplication with the reference code in code multipliers 13e, 14e; 13p, 14p; 13l, 14l. The reference code is led in different phases to the code multipliers 13e, 14e; 13p, 14p; 13l, 14l preferably so that three or more reference signals with different phases are formed of both the I component and the Q component. These reference signals are preferably inter alia integrated in integration blocks 15e, 16e; 15p, 16p; 15l, 16l. From the integration blocks 15e, 16e; 15p, 16p; 15l, 16l, the integrated signals are led to the control block 9, where, on the basis of the output signals of the different integration blocks, it is deduced inter alia whether the code phase of the reference code is leading (E, early), behind (L, late) or in the same phase (P, prompt) as the code phase of the received signal. On the basis of this deduction, the control block 9 will adjust the frequency of the numerically controlled oscillator 18 controlling the reference code generator 17. In a phase shift block 19, reference code signals of difference phases are further formed of the reference code formed by the reference code generator 17. Furthermore, the control block 9 deduces the possible frequency shift and adjusts the frequency of the numerically controlled oscillator 11. In each monitoring block, signal processing can be performed for one signal at a time, wherein to receive e.g. four signals simultaneously, there must be at least four monitoring blocks. It is obvious that the receiver shown in FIGS. 2a and 2b is only an example embodiment, and the present invention is not limited to be used in this receiver only.

Figure 3:
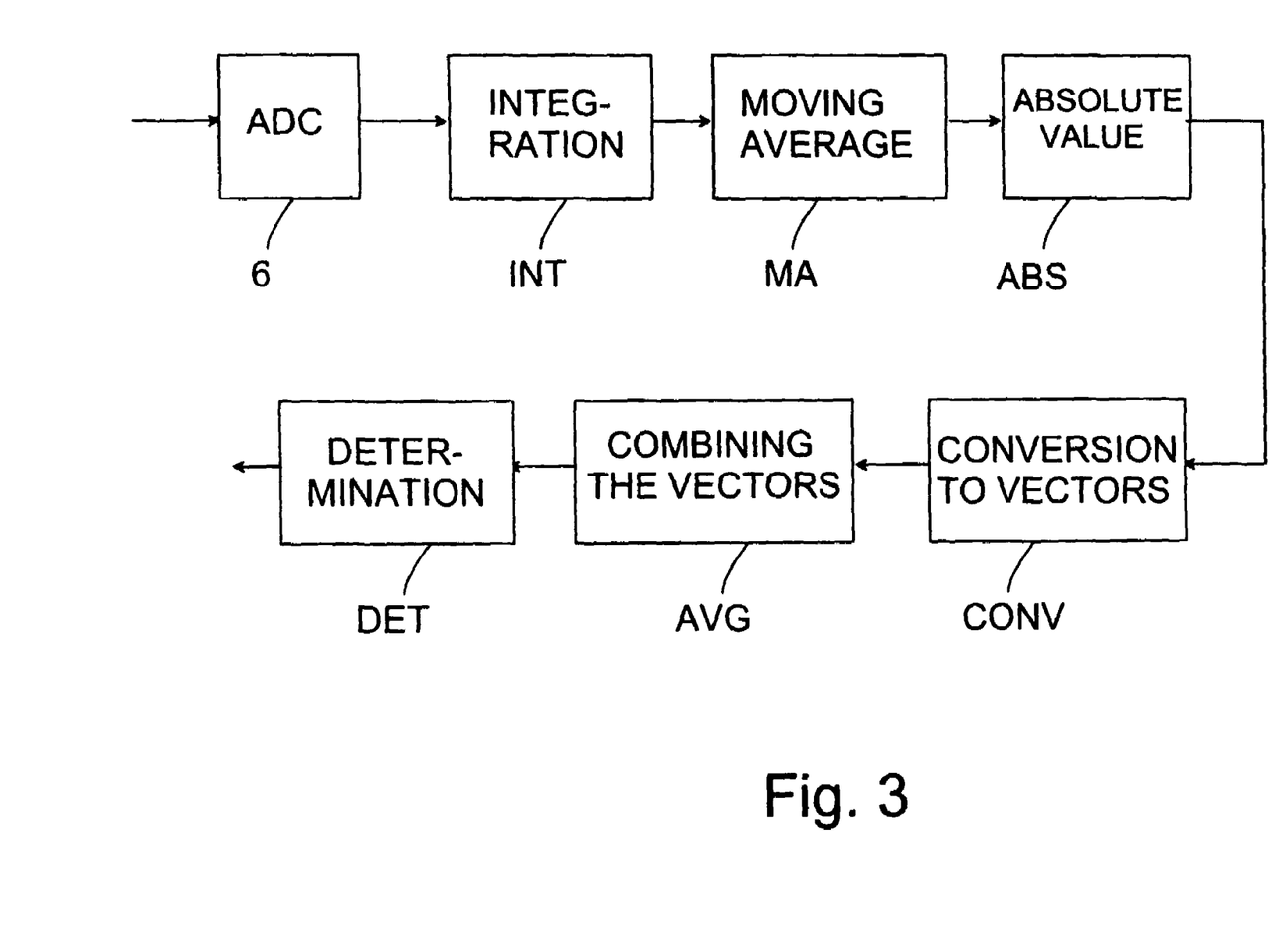
FIG. 3 shows a bit boundary detection block applying a method according to the invention in a reduced block chart.

The receiver PR preferably also comprises means for performing the functions of the wireless communication device, such as a second antenna 20, a radio part 21, audio means, such as a codec 22a, a speaker 22b and a microphone 22c, a display 23, a keypad 24, and a memory 25. The control block 9 can be at least partly common for performing the functions of the receiver PR and performing functions of the wireless communication device, or separate processors, or the like, can be used for these functions. In the following, the invention will be described in more detail with reference to the receiver shown in FIG. 2a and the bit boundary detection block shown in FIG. 3. In this context, the signals transmitted by satellites of the GPS system are used as an example, wherein the length of the epoch is 1 ms and a bit is formed of 20 epochs. However, it is obvious that the invention can be applied also in other systems in which repetition-coded signal is received, wherein the following numerical values are changed correspondingly.

However, navigation data cannot be detected in poor signal conditions, but the synchronizing of the signal can, nevertheless, be possible. After the receiver PR has been locked to the signal to be received (frequency and/or code phase), the bit boundary detection is started by using the method of the invention in the following manner.

Figure 4A:
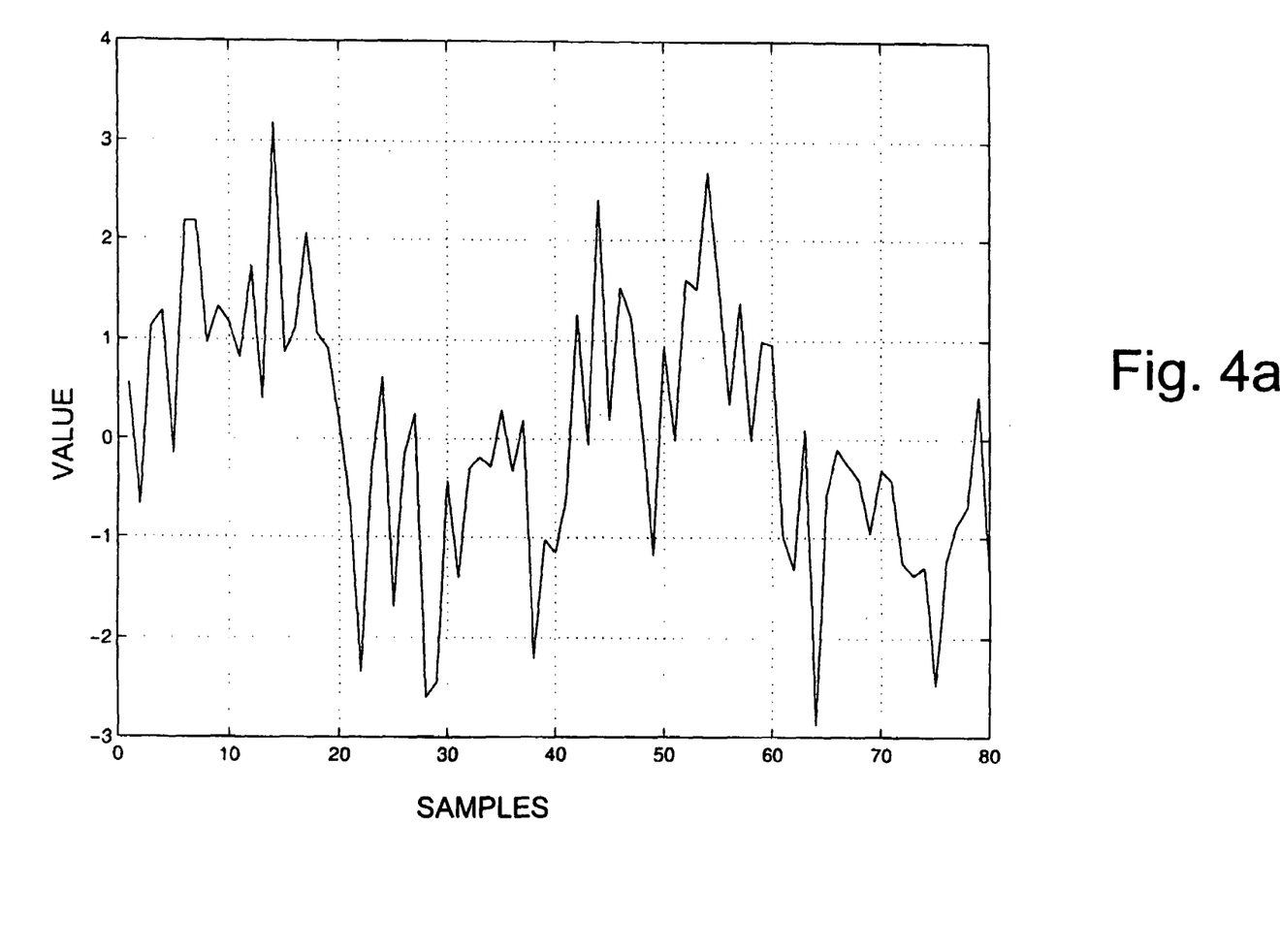
FIGS. 4a to 4d show sample signals in different steps of the method according to a preferred embodiment of the invention.

Transmission of different binary values is performed in code modulation for example in a manner that with the first value (e.g. +1) a modulating code is used as such and, in a corresponding manner, with a second binary value (e.g. −1), inverse values of the chips of the modulating mode are used. FIG. 4a shows an example of a satellite signal comprising four bits having the values +1, −1, +1, −1.

In the analog/digital converter 6 an analog/digital conversion is performed to the satellite signals to be received, wherein the further processing of the signals can be carried out on the basis of digital signals. In a receiver comprising a plurality of receiving channels a separate analog/digital converter for each channel can be used, or a common converter is used for the channels, wherein the sorting of the channel signals is performed after the analog/digital conversion, as in the receiver according to FIG. 2a. At first, a situation is considered in which the bit boundary is searched in a signal of one satellite. In this case the signal is preferably integrated in an integration block INT (FIG. 3) during the time of one epoch. The output signal of the integration block INT is lead to a moving calculation block MA, in which samples are taken from the signal during one bit, that is 20 samples, preferably approximately one in every 1 ms, and a given number of these samples are combined. Consequently, the fact that the same epoch is repeated in the code-modulated signal during the whole transmission is utilized here. The integration block INT can be for example integration blocks 15e, 16e; 15p, 16p; 15l, 16l, shown in FIG. 2b, for example integration blocks 15p, 16p that are used during the synchronization for expressing the cophasal code phase of the reference, which is mentioned earlier in this specification.

Figure 4B:
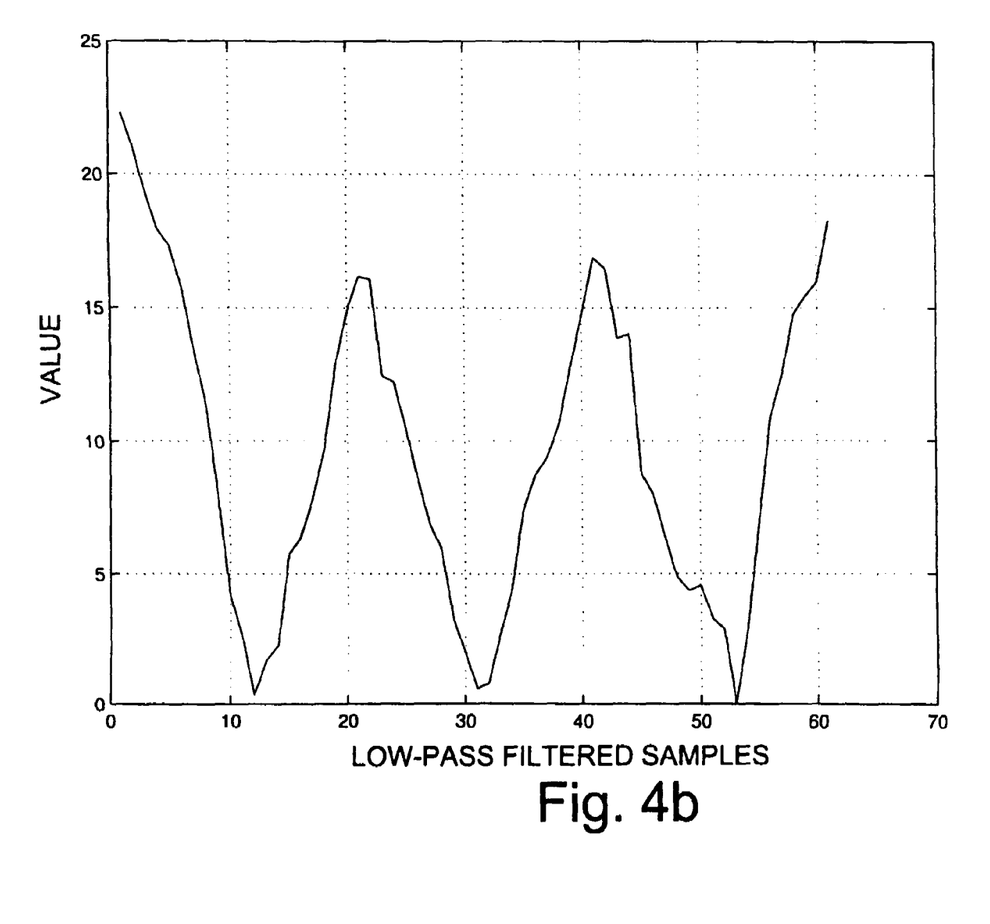
Figure 6:
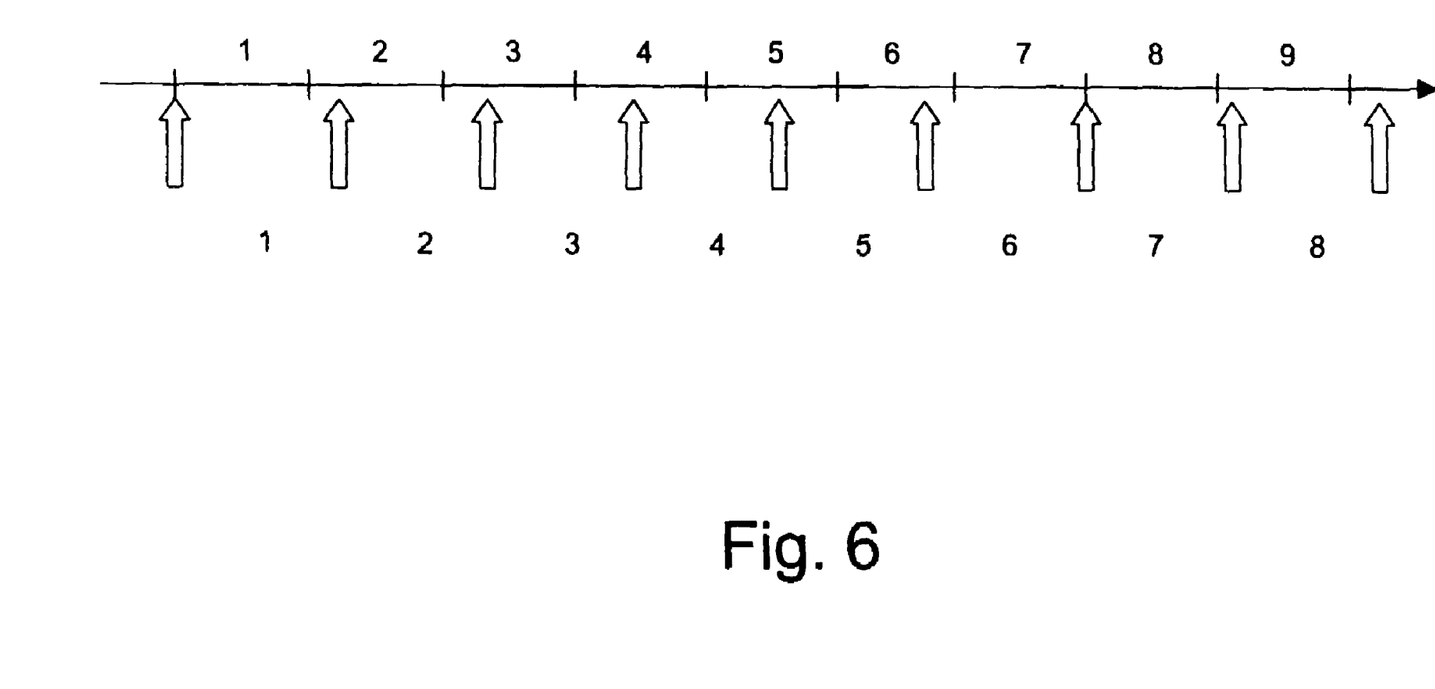
FIG. 6 shows in time scale an exemplified situation of mutual timing of integration times and epochs.

In practice, the moment the samples are taken is not always at the same point of the epoch, because in particular the Doppler shift and multipath propagation can cause time variable delay in the signal transmission time from satellite to receiver. In addition, the sample interval is not necessarily always exactly 1 ms inter alia due to inaccuracy of the clock of the receiver. In FIG. 6 this is illustrated in a manner that the arrows illustrate the moments when the epoch changes in the satellite signal received by the receiver. Short vertical lines illustrate the moments when the samples are taken, and the spaces between the lines illustrate the integration of the satellite signal performed by the integration block INT. The numbers above the horizontal line illustrate the order numbers of the integration intervals and, correspondingly, the numbers under the vertical line illustrate the numbers of the epochs. On the basis of the samples, the moving calculation block MA performs low-pass filtering calculation, preferably moving averages, wherein a first reference value is formed of samples 1 to 20 (if the epoch is 1/20) of the bit length, a second reference value is formed of samples 2 to 21, a third reference value is formed of samples 3 to 22, etc. An output signal of the moving calculation block MA is thus a signal of the triangular signal type having the maximum value near the moment when the bit is changing. Instead of the average, also other kinds of calculation can be performed, such as summing. In connection with this calculation, the data dependency of the bit (the effect of the sign) can be eliminated by using the absolute value of the values used in the calculation, or by performing a power increase to the values. FIG. 4b illustrates reference values formed as average values of the signal according to FIG. 4a.

Figure 4C:
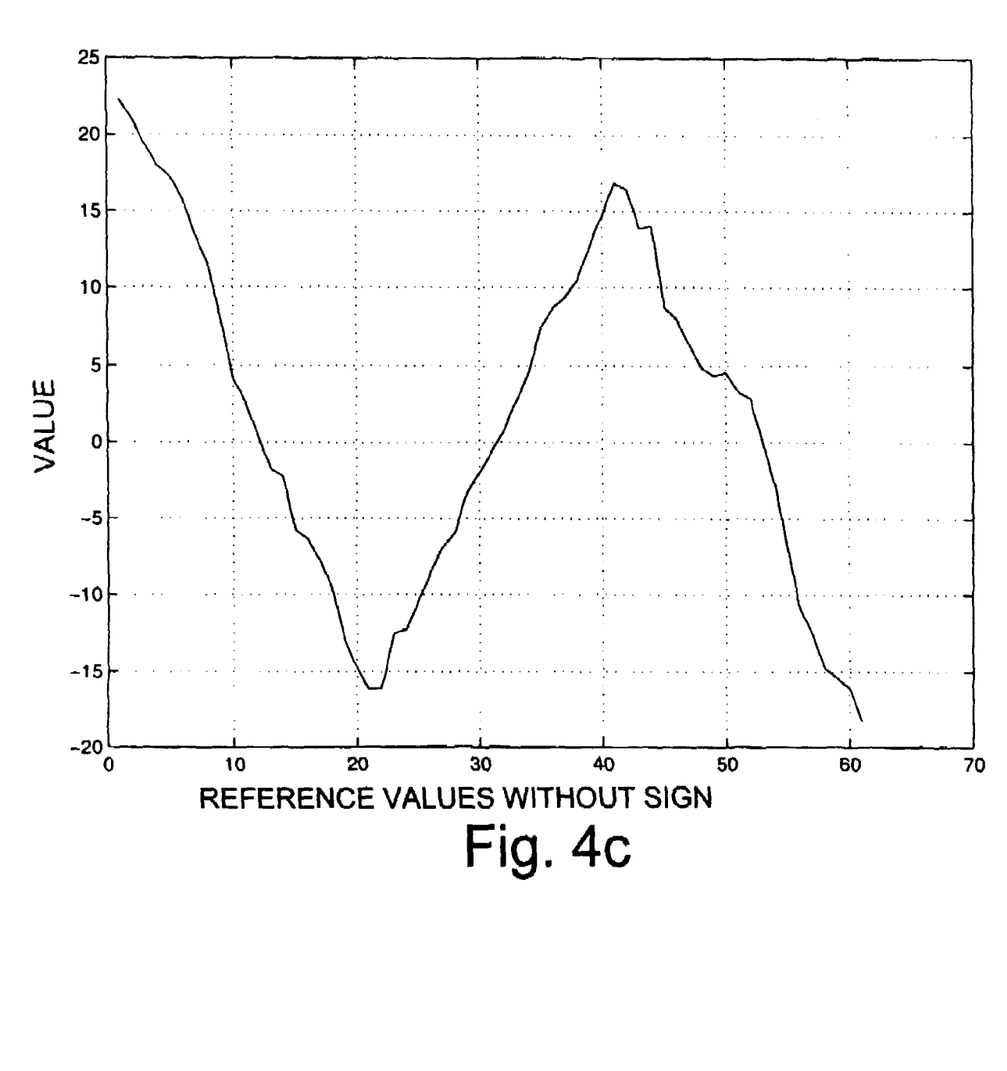
Figure 4D:
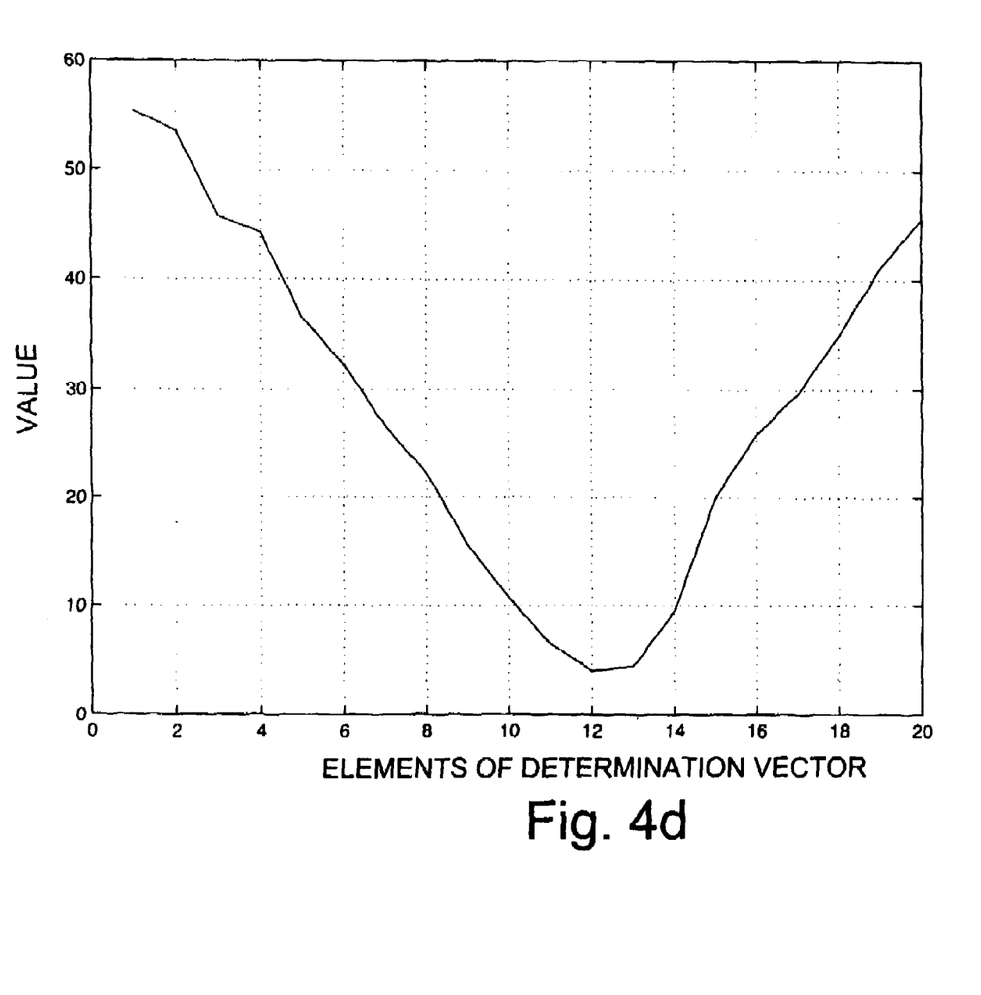
Figure 5:
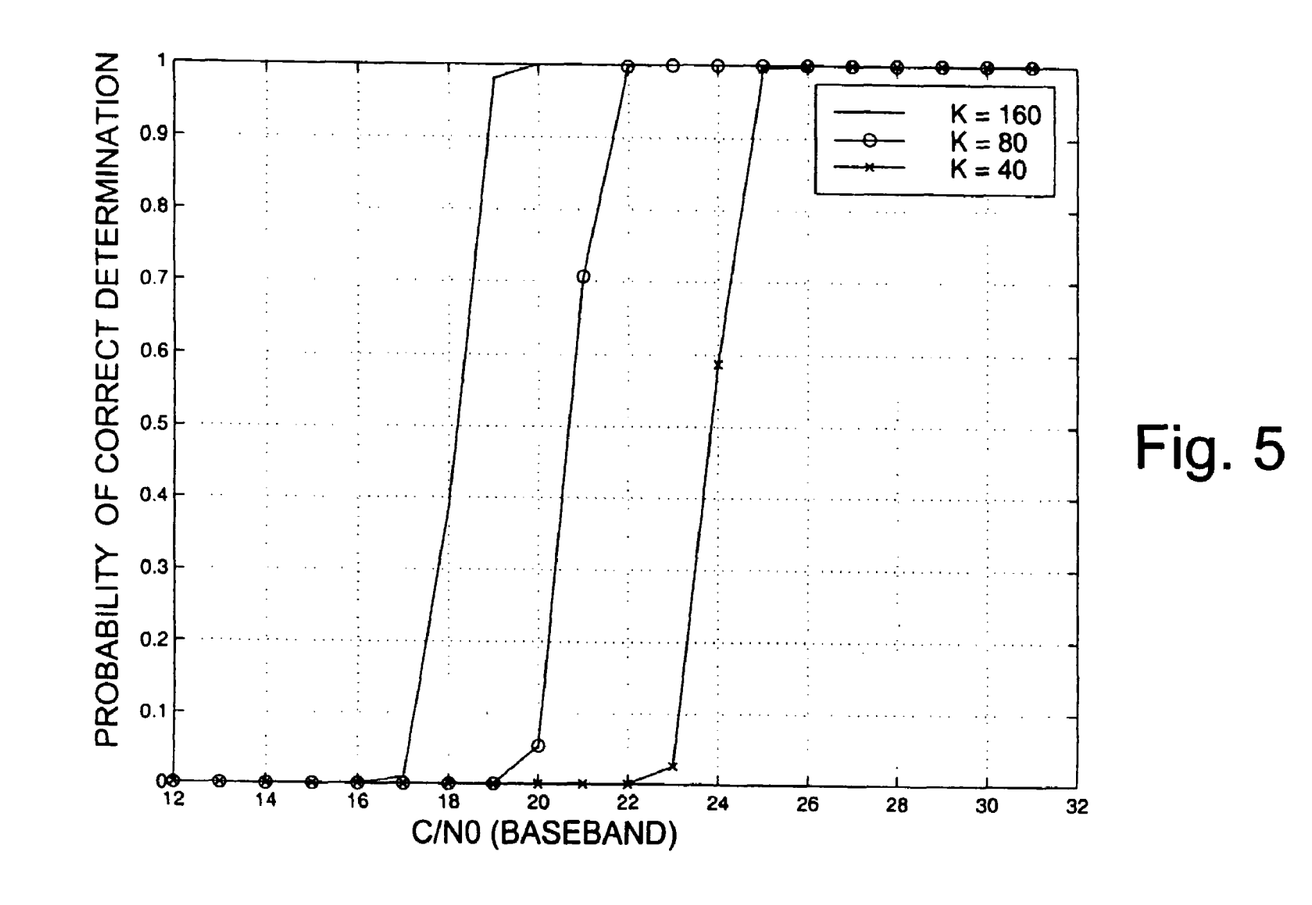
FIG. 5 shows probabilities for detection of bit boundary as a function of the number of the used vectors when applying a method of the invention.

In case the moving calculation block MA uses calculation that preserves the sign, such as average or summing, the absolute values of these reference values are computed in an absolute value block ABS in order to eliminate bit data dependency from the reference values. In this case, a group of numerical values as illustrated in FIG. 4c is then derived from the signal of FIG. 4b, which values can subsequently be treated as vectors. One vector is formed of a group of numerical values corresponding to the length of one bit, which in this example means 20 numerical values. In this case, the vectors are formed in the conversion block CONV for example of the numerical values 1 to 20, 21 to 40, 41 to 60, etc. These vectors are directed to the formation block AVG of the determination value, wherein a group of such vectors are connected counterpart element to counterpart element. This means that the first component of the first vector, the first component of the second vector, the first component of the third vector, etc. are connected for example by summing up or by averaging preferably incoherently in order to form the first determination value. In a corresponding manner, the second components of the vectors are connected in order to form a second determination value, etc. The number of vectors used in the formation of the determination values can vary in different applications and in different reception situations inter alia according to how attenuated and disturbed the received signal is. FIG. 4d illustrates the determination values formed of the numerical values of FIG. 4c. FIG. 5 shows the probability of the reliability in the bit boundary detection as a function of the signal/noise ratio C/NO with the numbers K of the vectors used in the formation of different determination values. In the examples of FIG. 5, three different values of K have been used: 40, 80 and 160, which correspond to the times used for detection of the bit boundary in the method according to the invention: 0.8 s, 1.6 s and 3.2 s.

These determination values are processed in a determination block DET where preferably a maximum point, that is the greatest determination value, is searched. If only one such maximum point is found, its index indicates the location of the bit boundary. In the situation in FIG. 4d, the maximum determination value is the first determination value, so the bit boundary is at the first sample, which is, for example in connection with FIG. 6, at the first arrow. If such a value that is almost as large as the maximum value is situated next to this maximum value, it is very probable that the real bit boundary is between these values, wherein the bit boundary can be determined by interpolating.

In the determination block DET it is possible, instead of searching for the maximum, to perform a comparison to a predetermined threshold value, wherein, when such a threshold value that is larger than (or as large as) the threshold value is found, the location point of the bit boundary is concluded from the determination value index exceeding this threshold value.

Even though it has been described above that for determining the determination values, certain measures are taken in separate blocks, and values are transferred between the blocks, it is obvious that these measures can be performed advantageously in the control block 9 as program codes of a signal processing unit (not shown), or the like. In this case it is not necessary to transfer the numerical values to different blocks, but for example in the memory means one or a plurality of areas of the memory means are allocated for storing these values. In this case, the function according to each block stores the values it has determined to a certain memory area, from which the function according to the following block retrieves these numerical values as the operation is proceeding.

The above mentioned operations are performed for a given period of time, for example until a wished number of vectors K have been formed, or until the maximum value exceeds a given threshold value. After this, a decision of the bit boundary is made in the determination block in a manner described above. The operation can also be repeated in case it is wished to redefine the location of the bit boundary, for example if the signal conditions change to a significant degree, or if the satellite, which the receiver has been following, changes.

In the embodiment described above, the integration of the signal was performed separately on each channel, wherein the moment when the integration is started or stopped is determined separately for each channel. Subsequently, a situation is described in which a so-called common dump is used, in which an integration is performed for every channel simultaneously, for example on the basis of the epoch of the signal of one channel. In this case, the timing of the epoch is not necessarily the same as that of the other channels, because the signals of different satellites have a different propagation time from the satellite to the receiver. However, the moving average is calculated in epochs. This requires some changes to the above-described method according to a preferred embodiment of the invention. For each channel, the phase of the epoch at the dump time has to be detected, so that the moment when the epoch is changing can be calculated relative to the integration time (that is, the moment in the integration interval at which the epoch changes). As the integration interval can, to a significant degree, differ from the timing of the epoch, the bit boundary can be situated relatively far from the moment when the integration interval is started or terminated. Thus, to form signal-specific reference values of each channel, a number of such signal-specific integration values are selected that are used in the transmission of one bit, in which values at least a half of the epochs belong to said integration interval. For example in the case of FIG. 6 when the epoch is longer than the integration time a moving average calculation is modified as follows. When calculating a moving average, at the sample of the calculating window there is calculated at least the difference between the moment at which the epoch changes and the moment at which the window is started. In case the sample obtained as the first sample of the calculation window is such that the moment of change of epoch has been at the end of the integration time, preferably after the midpoint of the integration time, this sample is not taken into account in the calculation, but the calculation of the moving average is started (start of the calculation window) from the next sample. Correspondingly, at the point of the last sample, there is examined the distance between the moment at which the epoch changes and the moment at which the window ends. If the sample obtained as the last sample of the calculation window is such that the moment of change of epoch has been at the beginning of the integration time, preferably before the midpoint of the integration time, a sample following this is used as the last sample in the calculation of the moving average (the end of calculation window). For example in the situation of FIG. 6, when the moving average is formed of the epochs 2 to 5, samples 2 to 6 are used, because in the sample 5 the epoch has changed after the midpoint of the integration time. In a corresponding manner, when the moving average is formed of the epochs 5 to 8, samples 6 to 9 are used, because in the sample 5 the epoch has changed after the midpoint of the integration time. The length of the calculation window used in the above-described example is for reasons of clarity four epochs, but as it has been described already earlier in this description, 20 epochs are used in the GPS system.

Correspondingly, in a situation in which the epoch is shorter than the integration time it is possible to apply the above-described deduction analogically in order to determine which samples are selected to the selection window at a time. However, the selection criteria are different than those described in the above situation.

Also, it may be necessary to make changes in the decision block if it is possible that the epoch differs significantly from the integration time phase. If the integration time ends for example near the midpoint of the epoch, such (successive) calculation windows starting either just before the bit boundary or right after it, are substantially equally good in terms of bit energy. In this case, either of the calculation windows can be used in the coherent one-bit size integration. This means that there can be a difference of approximately 1 ms in the bit boundary detection depending on which of the calculation windows is used. This may cause significant errors in calculation of pseudo ranges and in positioning. The effect of this error can be advantageously reduced as follows. Comparison if performed for the components adjacent to the maximum component of the vector from which the bit boundary is determined. If either of these components is significantly greater than the other component and is approximately of the same order as the maximum value then this sample indicates the direction where the real bit boundary is different from the bit boundary indicated by the maximum value. In this examination the last (20th) and the first component of the vector are interpreted as adjacent values. The bit boundary can now be approximated for example by interpolating as follows:

$$\text{chip\_at\_dump} + \frac{1023}{2} \times \frac{\text{val\_right} - \text{val\_left}}{\text{max\_val} - \min(\text{val\_right}, \text{val\_left})} \quad (2)$$

in which chip_at_dump is the order number of the chip of the epoch at the end of the integration time, max_val is the maximum value, val_right is the value on the right of the maximum value, and val_left is the value on the left of the maximum value. If the maximum value is the first value of the calculation window, the last value of the calculation window is interpreted as the value on the left of the maximum value, and correspondingly, if the maximum value is the last value of the calculation window, the first value of the calculation window is interpreted as the value on the right of the maximum value.

In a situation when the receiver is (in the code phase and carrier wave block) only frequency locked, the signal to be integrated is in the complex form. Thus, complex calculation is used in the calculation of the moving average, wherein in the absolute value block ABS a complex absolute value is formed, or some other real number without sign, such as the sum of the absolute value of the real part and the absolute value of the imaginary part (abs(Re)+abs(Im)).

Instead of calculating the average value or summing the vectors performed in a determination-value-forming block AVG it is possible to use also some other low-pass filtering function. Additionally, in the determination-value-forming block AVG it is possible to use adaptive determination function; for example the threshold value can be changed on the basis of the noise contents of the received signal.

By using the above-described method, the positioning can be performed also in poor signalling conditions, also indoors. In the method no information on the data used in the modulation of the signal is necessary, such as navigation data, for bit boundary determination according to the above-described method. After the bit boundary has been determined, it is possible, if necessary for example by using correlators to attempt to determine the starting points of the frames used in the transmission of the navigation data.

In particular when using the common integration principle it is possible in some applications to decrease the noise effect in a manner that the first and last values of the window are weighed less than other values. In the calculation of the weigh coefficient it is possible to use for example the maximal ratio combining (MRC) formula known as such.

After detecting the bit boundary it is possible to perform the positioning, even if the receiver did not have navigation data and the exact time data. In this context it is possible to utilize for example auxiliary data obtained from the mobile communication network, but also other methods are possible to apply in connection with the method of the present invention.

Even if the invention has been exemplified above by using a spread-spectrum signal that is modulated from a repetition-coded signal modulated with an individual code, the invention can be applied also in other systems using repetition coding and in which different phases of binary and other information are modulated by using symbols.

It is obvious that the present invention is not limited solely to the above-presented embodiments, but it can be modified within the scope of the appended claims.

The invention claimed is:

1. A method for detecting a boundary of an information element, the method comprising:
   receiving a repetition-coded signal, which is modulated with information elements, wherein a group of symbols forms one information element;
   forming reference values on the basis of the received signal;
   forming elements of at least one vector on the basis of the reference values, in which the number of elements of at least one vector equalling the number of symbols in said group of symbols forming the information element;
   forming elements of a determination vector on the basis of said at least one vector;
   searching the largest value of the elements of said determination vector, and
   using an index of the largest value of the element of said determination vector for indicating the boundary of the information element.

2. The method according to claim 1, wherein in said forming elements of at least one vector at least two vectors are formed, and said forming element of said determination vector comprises combining said at least two vectors, counterpart element to counterpart element.

3. The method according to claim 1, wherein said forming said reference values comprises integrating the received signal in integration intervals of one symbol length in order to form integration values, and lowpass filtering the integration values to form said reference values.

4. The method according to claim 1, wherein said forming said reference values comprises taking the absolute value of the reference values in order to form reference values without sign.

5. The method according to claim 1, wherein said searching comprises examining whether the value of at least one element adjacent to an element corresponding to the maximum value is of the same order of magnitude, wherein deducing the boundary of the information element by interpolating, otherwise deducing the boundary of the information element according to said largest value of the index.

6. The method according to claim 5, wherein the interpolating comprises using said largest value as well as at least one value of an element adjacent to said largest value.

7. The method according to claim 3, wherein said lowpass filtering comprises moving summing, and forming each reference value without sign by summing a determined number of integration values, and that partly different integration values are used in the formation of each reference value without sign.

8. The method according to claim 7, wherein said lowpass filtering comprises summing to each reference value a number of integration values that corresponds to the number of symbols used in the transmission of one information element, forming the a first reference value by starting from the a first integration value, forming a second reference value by starting from a second integration value, forming a third reference value by starting from a third integration value, and forming the reference values until a determined number of reference values has been formed.

9. The method according to claim 7, wherein said receiving comprises simultaneously receiving two or more repetition-coded signals,
   performing substantially simulataneously for each signal an integration of the received signals in one-symbol-length integration intervals in order to form signal specific integration values,
   defining a calculation window having a start and an end, forming signal specific reference values by taking samples of each signal specific integration value,
   using, in each of said low-pass filtering steps as many signal specific integration values as there are symbols used in the transmission of one information element,
   wherein the method comprises selecting for each of said low-pass filtering steps such signal specific integration values in which at least a half of the integrating interval is between the start and the end of the calculation window.

10. The method according to claim 1, wherein said receiving comprises receiving signals transmitted by satellites of a satellite positioning system.

11. The method according to claim 1, wherein the information used is binary information, and one bit of said binary information comprises one of said information elements.

12. A system comprising a receiver for receiving a repetition-coded signal that is modulated with information elements, in which signal a group of symbols has been used for transferring one information element, wherein the receiver comprises means for determining a boundary of the information element from the received signal, wherein the system further comprises at least:
- filtering means for forming reference values according to the received signal,
- vector-forming means for forming elements of at least one vector on the basis of said reference values, in which the number of elements in said at least one vector equalling the number of symbols in said group of symbols forming the information element,
- vector-processing means for forming elements of a determination vector on the basis of said at least one vector, and
- determination means for searching the greatest element of said determination vector, wherein an index of the element is arranged to be used for indicating the boundary of the information element.

13. The system according to claim 12, wherein at least two vectors are formed in the vector-forming means, wherein the determination vector is arranged to be formed in the vector-forming means by connecting said at least two vectors, counterpart element to counterpart element.

14. The system according to claim 12, further comprising means for integrating the received signal in integration intervals of one symbol in order to form integration values, and means for low-pass filtering of the integration values formed in the integration intervals.

15. The system according to claim 12, wherein the filtering means comprise means for forming reference values without sign by using the absolute value of the reference values.

16. The system according to claim 12, wherein the determination means comprise means for comparing the element with the greatest value and values adjacent to said element, wherein if the value of at least one element adjacent to the element corresponding to said greatest value is of the same order of magnitude, the boundary of the information element is arranged to be deduced by interpolating, otherwise the boundary of the information element is arranged to be deduced on the basis of the index of said greatest value.

17. The system according to claim 16, wherein in the interpolating said greatest value, and at least the value of one adjacent element of the same order of magnitude is arranged to be used.

18. The system according to claim 13, wherein the filtering means comprise means for performing a moving summing for the reference values, wherein each reference value without sign is arranged to be formed by summing a defined number of integration values, and in the forming of each reference value without sign partly different integration values are arranged to be used.

19. The system according to claim 12, wherein said system is a satellite positioning system comprising satellites sending the repetition-coded signal.

20. An electronic device comprising a receiver for receiving a repetition-coded signal that is modulated with information elements, in which signal a group of symbols has been used for transferring one information element, wherein the receiver comprises means for determining the boundary of the information element from the received signal, wherein the electronic device further comprises at least:
- filtering means for forming reference values on the basis of the received signal,
- vector-forming means for forming elements of at least one vector on the basis of said reference values, in which the number of elements of said at least one vector equalling the number of symbols in said groups of symbols forming the information element,
- vector-processing means for forming elements of a determination vector on the basis of said at least one vector, and
- determination means for searching the greatest element of said determination vector, wherein an index of the element is arranged to be used for indicating the boundary of the information element.

21. The electronic device according to claim 20, wherein at least two vectors are formed in the vector-forming means, wherein the a terminating vector is arranged to be formed in the vector-processing means by connecting said at least two vectors, counterpart element to counterpart element.

22. The electronic device according to claim 20, wherein the electronic device comprises means for integrating the received signal in one-symbol size integration intervals in order to form integration values, and means for low-pass filtering of the integration values formed in the integration intervals.

23. The electronic device according to claim 20, wherein the low-pass filtering means comprise means for forming reference values without sign by using the absolute value of the reference values.

24. The electronic device according to claim 20, wherein the determination means comprise means for comparing the element with the greatest value and values adjacent to said element, wherein if the value of at least one element adjacent to the element corresponding to said greatest value is of the same order of magnitude, the boundary of the information element is arranged to be deduced by interpolating, in other case the boundary of the information element is arranged to be deduced on the basis of the index of said greatest value.

25. The electronic device according to claim 24, wherein in the interpolating, said greatest value and at least the value of one adjacent element of the same order of magnitude is arranged to be used.

26. The electronic device according to claim 20, wherein the filtering means comprise means for performing a moving summing for reference values, wherein each reference value without sign is arranged to be formed by summing a defined number of integration values, and in the forming of each reference value without sign partly different integration values are arranged to be used.

27. The electronic device according to claim 20, wherein the receiver is a satellite positioning receiver.

28. The electronic device according to claim 20, further comprising means for performing the functions of a mobile station.

* * * * *